United States Patent Office 2,781,404
Patented Feb. 12, 1957

2,781,404

SYNTHESIS OF ORTHO-ALKYL-p-ALKOXY-PHENOLS

Robert H. Rosenwald, Western Springs, Ill., assignor to Universal Oil Products Company, Des Plaines, Ill., a corporation of Delaware No Drawing. Application December 28, 1953, Serial No. 400,818

8 Claims. (Cl. 260—613)

This application is a continuation-in-part of my copending application Serial No. 244,464, filed August 30, 1951, now abandoned.

This invention relates to the synthesis of ortho-alkyl-p-alkoxyphenols, and more particularly to the preparation of ortho-tert-alkyl-p-alkoxyphenols.

More particularly the present invention is directed to a combination process which comprises the alkylation of hydroquinone to form a mono-alkyl-hydroquinone and the etherification of said mono-alkyl-hydroquinone to form an ortho-alkyl-p-alkoxyphenol.

Ortho-alkyl-p-alkoxyphenols are generally prepared in low yields by a four-step process. In the first step, hydroquinone is etherified, usually in caustic solution, with an etherification agent such as dialkyl sulfate, alkyl halide, etc. This reaction suffers from the disadvantage that there is no known means of preventing the reaction from going too far with the subsequent formation of large quantities of 1,4-dialkoxybenzenes. The desired reaction product, the p-alkoxyphenol, must then be separated from the 1,4-dialkoxybenzene by a suitable means, such as a caustic extraction, followed by a neutralization, or by distillation, etc. The extra operations are, of course, highly undesirable. The thus separated p-alkoxyphenol is then alkylated by one of the well-known methods such as with an olefin, alcohol, alkyl halide, etc., in the presence of a suitable catalyst such as sulfuric acid, phosphoric acid, hydrogen fluoride, etc. The reaction product obtained therefrom is a mixture of the desired ortho-alkyl-p-alkoxyphenol along with about an equal quantity of undesired m-alkyl-p-alkoxyphenol. The desired ortho-alkyl-p-alkoxyphenol must then be separated from the undesired reaction product, usually by the difference in caustic solubility of the two isomers. Such operations are, of course, highly undesirable.

In accordance with the present invention, hydroquinone, obtained from any suitable source, is converted into an ortho-alkyl-p-alkoxyphenol in two steps and with a minimum formation of undesirable by-products.

In accordance with the present invention, hydroquinone is reacted with an alkylating agent in the presence of an alkylating catalyst. Suitable alkylating agents include an olefin, alcohol, alkyl halide, or other olefin-producing material. Thus, if tert-butyl hydroquinone is desired, isobutylene or tert-butyl alcohol may be used as the alkylating agent.

Any suitable alkylation catalyst may be used. Particularly preferred alkylating catalysts comprise metal halides such as aluminum chloride, zinc chloride, ferric chloride, etc., naturally occurring clays which may or may not be acid activated, such as Tonsil, Filtrol, etc., and synthetically prepared mixtures of silica and nonreducible metal oxide such as silica-alumina, silica-magnesia, silica-zirconia, etc. In some cases acids such as sulfuric acid, phosphoric acid, hydrofluoric acid, etc., may be employed but not necessarily with equivalent results.

The reaction may be effected at a suitable temperature which in general will range from room temperature or below to about 300° C. The particular temperature to be employed will depend upon the strength of the acid catalyst used and in general it may be stated that lower temperatures may be employed with the stronger acid catalysts while higher temperatures are required with weaker acid catalysts.

In accordance with the present invention, the monoalkyl hydroquinone produced as hereinbefore set forth, is reacted with an etherifying agent, usually in the presence of caustic. Suitable etherifying agents include dialkyl sulfates, alkyl halides, and in some cases alcohols and ethers. Thus, if ortho-tert-butyl-p-methoxyphenol is desired, mono-tert-butyl hydroquinone may be etherified with dimethyl sulfate, methyl iodide, methyl bromide, or methyl chloride, in the presence of caustic, or with methyl alcohol or dimethyl ether under high temperature (150–225° C.), high pressure (100–2000 p. s. i.) conditions.

Other etherifying agents include vinyl ethers to produce substituted alkoxy derivatives. The following reaction with dihydropyran, an example of a vinyl ether, can be carried out in the presence of an acid catalyst:

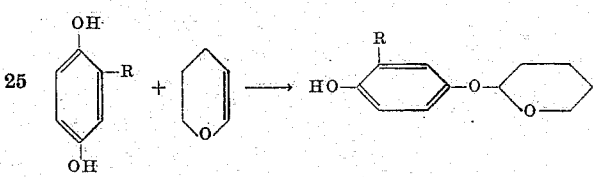

The etherification reaction may be effected at a suitable temperature which in general will range from room temperature to about 300° C.

In carrying out the etherification reaction, the mol ratio of alkyl hydroquinone reactant to etherification agent reactant will range from about 0.8 to about 1.25. While equimolecular quantities of the reactants are normally utilized, an excess of etherification agent, as indicated above, will still result in high yields of the desired ortho-alkyl-p-alkoxyphenol product.

Both the alkylation reaction and the etherification reaction as hereinbefore set forth may be carried out in the presence of a suitable solvent. Such solvents include saturated hydrocarbons such as paraffins and cycloparaffins, and mixtures thereof, aromatic hydrocarbons such as benzene, toluene, xylenes, and mixtures thereof with the before-mentioned saturated hydrocarbons, alcohols such as methyl alcohol, ethyl alcohol, propyl alcohol, etc., ketones such as acetone, methyl ethyl ketone, etc., aldehydes, nitroparaffins, water, etc. The actual solvent for use in each reaction will depend upon solubility factors, temperature ranges in which the reaction is to be carried out, etc. Particularly preferred solvents comprise the aromatic hydrocarbons and the alcohols.

In accordance with the present invention, hydroquinone is converted into an ortho-alkyl-p-alkoxyphenol by a combination of an alkylation reaction followed by an etherification reaction. It is apparent that this process has the advantage of accomplishing this conversion with a minimum formation of any undesirable by-products, thereby eliminating the necessity of further purification steps.

As further examples of typical reactions effected in accordance with the present invention, mono-isopropyl hydroquinone may be etherified in a methanol solution in the presence of potassium hydroxide to produce ortho-isopropyl-p-methoxyphenol. The mono-isopropyl hydroquinone may be prepared by reacting hydroquinone with propylene under pressure in the presence of a silica-alumina catalyst.

Similarly, mono-tert-butyl hydroquinone may be etherified in a caustic toluene solution with dimethylsulfate to produce ortho-tert-butyl-p-methoxyphenol. The monotert-butyl hydroquinone may be prepared by reacting hydroquinone with tert-butyl chloride in the presence of zinc chloride as a catalyst.

The ortho-alkyl-p-alkoxyphenols formed in accordance with the present invention, are useful as antioxidants in organic substances which deteriorate due to oxidation, polymerization, or other undesired reactions. In fact, ortho-alkyl-p-alkoxyphenols are about three times as potent in antioxidant activity as their meta-alkyl isomers which have heretofore been formed in approximately equal quantities along with the desired ortho-alkyl isomers. The ortho-alkyl-p-alkoxyphenols may also be used as germicides, fungicides, etc.

The following examples are introduced to illustrate further the novelty and utility of the present invention but not with the intention of unduly limiting the same.

Example I

Mono-tert-butyl-hydroquinone was prepared by butylation of a hydroquinone as follows. A mixture of hydroquinone (220 grams), silica-alumina catalyst (20 grams), and isobutylene (140 grams) was heated in a rotating three-liter autoclave for seven hours at 200° C. This reaction mixture was extracted with 1 liter of boiling benzene, thus separating the butylated hydroquinone which is soluble therein from the unreacted hydroquinone which can then be reused or recycled. For purification purposes, the butylated hydroquinone was dissolved in 8% sodium hydroxide solution and then sprung therefrom by neutralization with dilute sulfuric acid. This yielded 105 grams of mono-tert-butyl hydroquinone. Crystallization of a portion of this product in methyl alcohol gave purified mono-tert-butyl hydroquinone, M. P. 126–128° C.

16.6 grams of the thus produced mono-tert-butyl hydroquinone was dissolved in 200 ml. of toluene to which 5.9 grams of sodium methylate had been added. The mixture was heated to 100° C. and 13.9 grams of dimethyl sulfate were added rapidly with stirring to the hot solution. The stirring was continued for 30 minutes. The methyl alcohol formed during the reaction was removed by distillation from the hot toluene solution. After cooling, the reaction mixture was extracted with Claisen solution (25% KOH, 25% H₂O, and 50% methyl alcohol) and after neutralization, analyzed by infrared techniques. The tert-butyl-p-methoxyphenol fraction contained 89% ortho-tert-butyl-p-methoxyphenol and 11% meta-tert-butyl-p-methoxyphenol.

Example II 16.6 grams of mono-tert-butyl hydroquinone as described in Example I was dissolved in 200 ml. of methyl alcohol to which 7.0 grams of potassium hydroxide had been added. To this mixture was added 17.0 grams of methyl iodide and the mixture was allowed to stand for 9 days at room temperature, followed by evaporation of the methyl alcohol, and an extraction of the product with Claisen solution, and a subsequent neutralization. Analysis of the tert-butyl-p-methoxyphenol fraction showed that it contained 94% ortho-tert-butyl-p-methoxyphenol and 6% of meta-tert-butyl-p-methoxyphenol.

I claim as my invention:

1. The process which comprises reacting an ortho-alkyl hydroquinone with from about 0.8 to about 1.25 mols of an etherification agent per mol of ortho-alkyl-hydroquinone at a temperature of from about room temperature to about 300° C. to form a major proportion of an ortho-alkyl-p-alkoxyphenol and a minor proportion of a meta-alkyl-p-alkoxyphenol.

2. The process of claim 1 further characterized in that said etherification agent is selected from the group consisting of dimethylsulfate, methyl iodide, methyl bromide, methyl chloride, methyl alcohol and dimethyl ether.

3. The process which comprises reacting an ortho-tertiary alkyl hydroquinone with from about 0.8 to about 1.25 mols of an etherification agent per mol of ortho-tertiary alkyl hydroquinone at a temperature of from about room temperature to about 300° C. to form a major proportion of an ortho-tertiary-alkyl-p-alkoxyphenol and a minor proportion of a meta-tertiary-alkyl - p - alkoxyphenol.

4. The process which comprises reacting an ortho-tertiary butyl hydroquinone with from about 0.8 to about 1.25 mols of an etherification agent per mol of ortho-tertiary butyl hydroquinone at a temperature of from about room temperature to about 300° C. to form a major proportion of an ortho-tertiary-butyl-p-alkoxyphenol and a minor proportion of a meta-tertiary-butyl-p-alkoxyphenol.

5. The process which comprises reacting an ortho-alkyl hydroquinone with from about 0.8 to about 1.25 mols of an etherification agent per mol of ortho-alkyl hydroquinone, said reaction being carried out in the presence of caustic at a temperature of from about room temperature to about 300° C. with an etherification agent selected from the group consisting of dimethylsulfate, methyl iodide, methyl bromide, and methyl chloride, to form a major proportion of an ortho-alkyl-p-methoxyphenol and a minor proportion of a meta-alkyl-p-methoxyphenol.

6. The process which comprises reacting an ortho-tertiary alkyl hydroquinone with from about 0.8 to about 1.25 mols of an etherification agent per mol of ortho-tertiary alkyl hydroquinone, said reaction being carried out in the presence of caustic at a temperature of from about room temperature to about 300° C. with an etherification agent selected from the group consisting of dimethylsulfate, methyl iodide, methyl bromide, and methyl chloride, to form a major proportion of an ortho-tertiary-alkyl-p-methoxyphenol and a minor proportion of a meta-tertiary-alkyl-p-methoxyphenol.

7. The process which comprises reacting an ortho-tertiary butyl hydroquinone with from about 0.8 to about 1.25 mols of an etherification agent per mol of ortho-tertiary butyl-hydroquinone, said reaction being carried out in the presence of caustic at a temperature of from about room temperature to about 300° C. with an etherification agent selected from the group consisting of dimethylsulfate, methyl iodide, methyl bromide, and methyl chloride, to form a major proportion of an ortho-tertiary-butyl-p-methoxyphenol and a minor proportion of a meta-tertiary-butyl-p-methoxyphenol.

8. The process which comprises reacting an ortho-alkyl hydroquinone with from about 0.8 to about 1.25 mols of an etherification agent selected from the group consisting of methyl alcohol and dimethyl ether per mol of ortho-alkyl hydroquinone at a temperature of from about 150° to about 225° C. and a pressure of from about 100 to about 2000 p. s. i. to form a major proportion of an ortho-alkyl-p-methoxyphenol and a minor proportion of a meta-alkyl-p-methoxyphenol.

No references cited.